(12) United States Patent
Jia et al.

(10) Patent No.: US 11,504,652 B2
(45) Date of Patent: Nov. 22, 2022

(54) KIND OF AN INTEGRATED SEWAGE TREATMENT EQUIPMENT FOR PAPER MILL

(71) Applicant: Zhengzhou University of Aeronautics, Zhengzhou (CN)

(72) Inventors: Xiaofeng Jia, Zhengzhou (CN); Yu Sun, Zhengzhou (CN); Wei Yang, Zhengzhou (CN); Xiangguo Li, Zhengzhou (CN); Jianghong Huangfu, Zhengzhou (CN); Hui Guo, Zhengzhou (CN); Junfeng Zheng, Zhengzhou (CN); Xiaoyu Chen, Zhengzhou (CN); Zehua Wang, Zhengzhou (CN); Zhanyong Ji, Zhengzhou (CN); Yifeng Xu, Zhengzhou (CN); Huxiang Xu, Zhengzhou (CN); Mengqiao Yang, Zhengzhou (CN); Qian Zheng, Zhengzhou (CN); An Sun, Zhengzhou (CN)

(73) Assignee: ZHENGZHOU UNIVERSITY OF AERONAUTICS, Zhengzhou (CN)

( * ) Notice: Subject to any disclaimer, the term of this patent is extended or adjusted under 35 U.S.C. 154(b) by 154 days.

(21) Appl. No.: 17/070,677

(22) Filed: Oct. 14, 2020

(65) Prior Publication Data
US 2021/0121798 A1 Apr. 29, 2021

(30) Foreign Application Priority Data
Oct. 26, 2019 (CN) .......................... 201911026577.9

(51) Int. Cl.
*B01D 21/00* (2006.01)
*B01D 21/01* (2006.01)
(Continued)

(52) U.S. Cl.
CPC ......... *B01D 21/0012* (2013.01); *B01D 21/01* (2013.01); *B01D 33/15* (2013.01);
(Continued)

(58) Field of Classification Search
CPC .... B01D 21/0012; B01D 21/01; B01D 33/15; B01D 33/29; B01D 33/015; B01D 33/39;
(Continued)

(56) References Cited

FOREIGN PATENT DOCUMENTS

| CN | 207986771 U | * | 10/2018 |
| KR | 101770412 B1 | * | 4/2017 |

* cited by examiner

*Primary Examiner* — Bradley R Spies
*Assistant Examiner* — Jeannie McDermott
(74) *Attorney, Agent, or Firm* — WPAT, PC

(57) ABSTRACT

The present invention provides a kind of an integrated sewage treatment equipment for paper mill, which belongs to the technical field of sewage treatment, includes a box body, and the box body is arranged a water injection gap on the upper part at one side, the bottom of the box body is connected with a drainage pipe, and a filter assembly is arranged inside the box body movably, and the inner wall of the box body is equipped with a limit component which provides guidance for the movement of the filter assembly; the filter assembly includes several concentrically arranged annular plates, and two adjacent groups of annular plates are connected by a netting. The bottom of the annular plate is equipped with a chemical dosing component, and the inner side of the innermost annular plate is equipped with an adapter sleeve.

5 Claims, 2 Drawing Sheets

(51) Int. Cl.
    *B01D 33/15*         (2006.01)
    *B01D 33/29*         (2006.01)
    *C02F 1/00*          (2006.01)
    *C02F 1/52*          (2006.01)
    *C02F 103/28*        (2006.01)

(52) U.S. Cl.
    CPC .............. *B01D 33/29* (2013.01); *C02F 1/004* (2013.01); *C02F 1/5281* (2013.01); *C02F 2103/28* (2013.01); *C02F 2201/003* (2013.01)

(58) Field of Classification Search
    CPC ...... B01D 37/025; C02F 1/004; C02F 1/5281; C02F 2103/28; C02F 2201/003; C02F 1/688
    See application file for complete search history.

KIND OF AN INTEGRATED SEWAGE TREATMENT EQUIPMENT FOR PAPER MILL

FIELD OF THE INVENTION

The present invention belongs to the technical field of sewage treatment, specifically relates to a kind of an integrated sewage treatment equipment for paper mill.

BACKGROUND OF THE INVENTION

The pollution of the papermaking industry is relatively serious, and papermaking wastewater contains a lot of pollutants.

In the prior art, papermaking wastewater is usually treated by adding purification agents, such as flocculants. Currently, the treatment equipment for papermaking wastewater is to sprinkle the purification agents, such as flocculants, over the top of the sewage tank, and mix it with agitating equipment to accelerate the mixing uniformity of the of pollutants and flocculants in the sewage. However, as for the aforesaid methods, the flocculant sprinkled over the top of the sewage is hard to enter into the lower layer of the sewage within a short time, which makes the flocculant and the sewage cannot be integrated thoroughly and completely, and thus results in the treatment effect of sewage is less than satisfactory.

SUMMARY OF THE INVENTION

In view of the abovementioned shortcomings of the prior art, the technical problem needs to be solved by the embodiments of the present invention is to provide a kind of an integrated wastewater treatment equipment for paper mill.

In order to solve the above technical problems, the present invention provides the following technical scheme:

A kind of an integrated paper mill sewage treatment equipment, includes a box body, and the box body is arranged a water injection gap on the upper part at one side, the bottom of the box body is connected with a drainage pipe, and a filter assembly is arranged inside the box body movably, and the inner wall of the box body is equipped with a limit component which provides guidance for the movement of the filter assembly; the filter assembly includes several concentrically arranged annular plates, and two adjacent groups of annular plates are connected by a netting. The bottom of the annular plate is equipped with a chemical dosing component, and the inner side of the innermost annular plate is equipped with an adapter sleeve. The middle of the adapter sleeve is screw-thread fitted with a drive rod, and one end of the drive rod is running fitted to a bearing seat installed inside the box body, and the other end extends to the outside of the box body and is fixedly connected with a motor.

As a further improvement scheme of the present invention: several said annular plates are sequentially arranged at equal intervals.

As a further improvement scheme of the present invention: the chemical dosing component includes several detachable chemical dosing boxes arranged at the bottom of the annular plate, and the purification agent is stored in the chemical dosing box, and the side wall of the chemical dosing box is equipped with a through hole.

As a further improvement scheme of the present invention: the upper part of the chemical dosing box is equipped with a threaded hole, and the bottom of the annular plate is fixedly connected with the threaded post adapted to the threaded hole.

As a further improvement scheme of the present invention: the limit component includes a guide bar installed on the inside wall of the box body, and the outside of the outermost annular plate is cut a card slot adapted to the guide bar.

As a further improvement scheme of the present invention: the water injection gaps are symmetrically arranged in two groups against box body.

As a further improvement scheme of the present invention: a drain valve is arranged on the drainage pipe.

Compared with the prior art, the beneficial effects of the present invention are:

In the embodiment of the present invention, through the arrangement of the filter assembly and the chemical dosing component, the filter assembly and the chemical dosing component are driven by the motor, and thus penetrate into the sewage. In this process, the purification agent in the chemical dosing component diffuses into the sewage with different depths, and thus completely mixes with sewage to improve the reaction effect of the purification agent against sewage, as well as improve the sewage purification efficiency. After the colloid in the sewage is precipitated, the motor drives the filter assembly to move upwards to take the colloid away from the sewage, and thus completes the separation of colloid and sewage.

Figure 1:
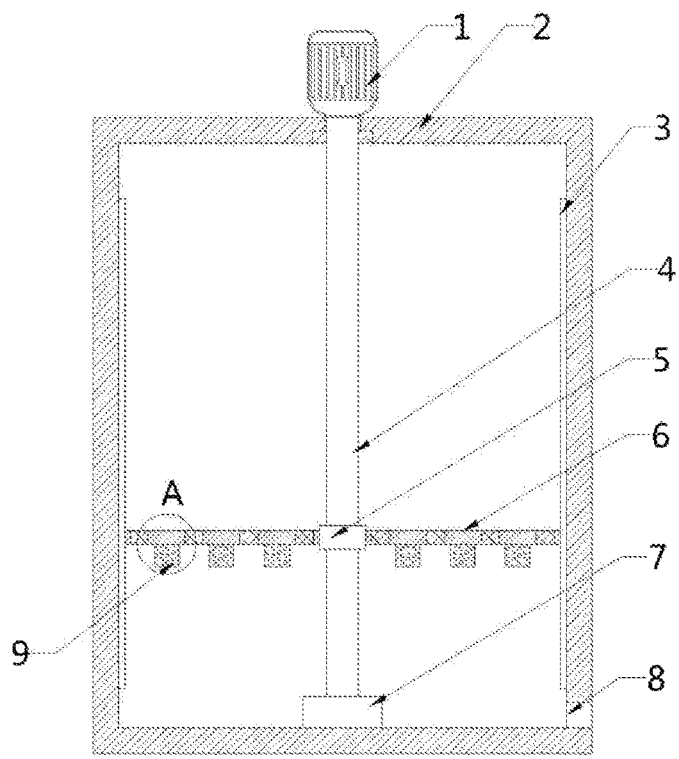
FIG. 1 is a schematic diagram of a kind of an integrated wastewater treatment equipment for paper mill.
Figure 2:
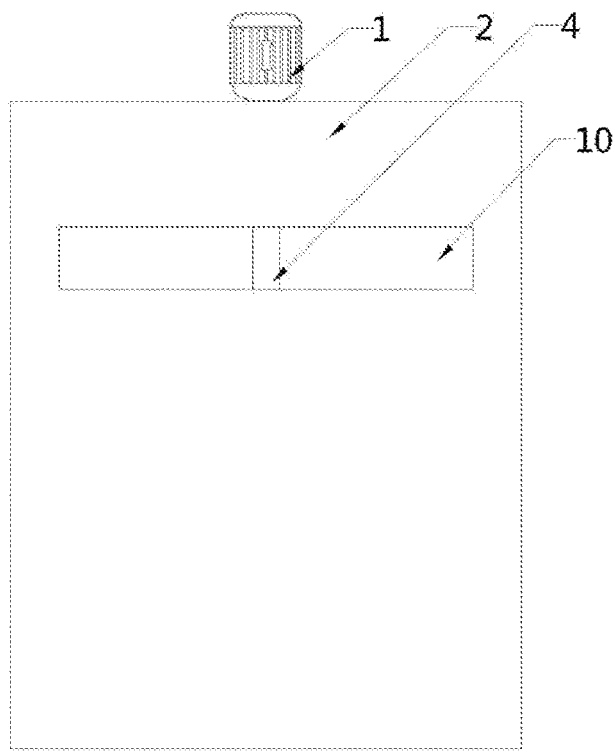
FIG. 2 is a front view of a kind of an integrated wastewater treatment equipment for paper mill.
Figure 3:
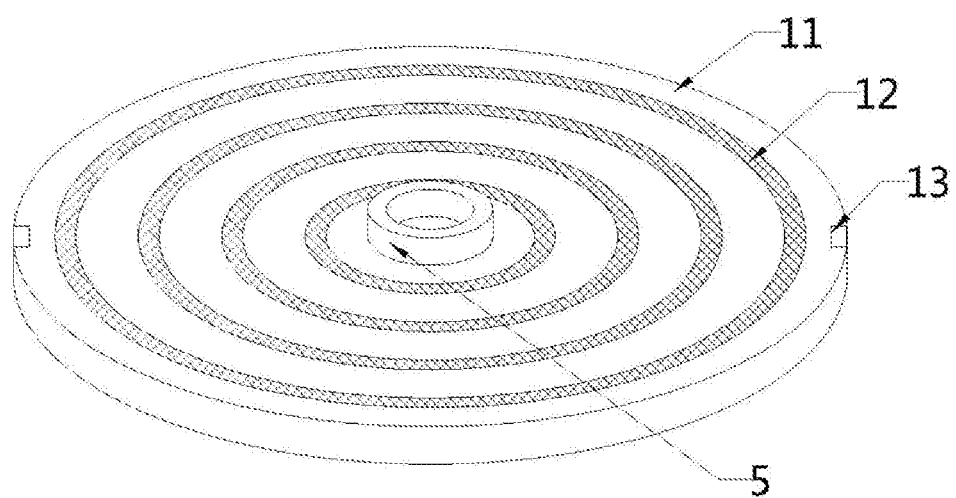
FIG. 3 is a schematic diagram of a filter assembly used in a kind of an integrated wastewater treatment equipment for paper mill.
Figure 4:
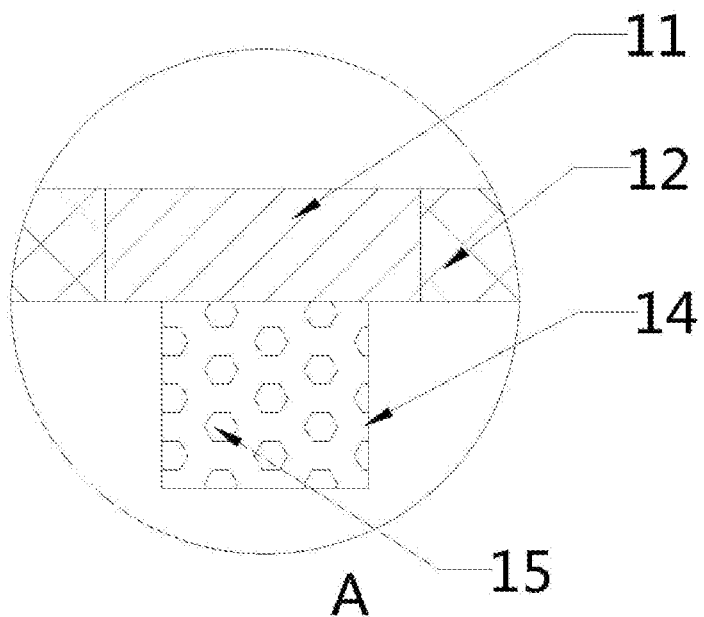
FIG. 4 is an enlarged diagram of area A in FIG. 1.

Wherein: 1—motor, 2—box body, 3—guide bar, 4—drive rod, 5—adapter sleeve, 6—filter assembly, 7—bearing seat, 8—drainage pipe, 9—chemical dosing component, 10—water injection gap, 11—annular plate, 12—netting, 13—card slot, 14—chemical dosing box, 15—through hole.

DETAILED DESCRIPTION OF THE INVENTION

The technical scheme of the present patent will be described in further detail below in conjunction with specific embodiments.

The embodiments of the present patent are described in detail below. Examples of the embodiments are shown in the accompanying drawings, wherein the same or similar mark numbers are used to indicate the same or similar elements or elements with the same or similar functions. The embodiments described below with reference diagrams are exemplary, and are only used to explain the patent, thus cannot be understood as a limitation of the present patent.

In the description of the present patent, it should be understood that the orientation or positional relationship indicated by the terms of "center", "upper", "lower", "front", "rear", "left", "right", "vertical", "horizontal", "top", "bottom", "inner", and "outer", etc. are based on the orientation or positional relationship shown in the drawings, and are only used for the convenience of describing the present patent and simplifying the description, rather than indicating or implying that the device or element referred to must have a specific orientation, or to be constructed and operated in a specific orientation, and thus cannot be understood as a limitation of the present patent.

As for the description of the present patent, it should be noted that, unless otherwise clearly specified and limited, the terms of "install", "link", "connect", and "arrange" should be understood in a broad sense. For example, it can be constructed as fixedly connect or arrange, also can be understood as detachably connect or arrange, or integrally connect or arrange. For those skilled in the art, the specific meanings of the above-mentioned terms in the present patent can be understood according to specific circumstances.

Embodiment 1

Referring to FIGS. 1-4, this embodiment provides a kind of an integrated sewage treatment equipment for paper mill, includes a box body 2, the box body 2 is arranged a water injection gap 10 on the upper side, and the bottom of the box body 2 is connected with a drainage pipe 8. A filter assembly 6 is arranged inside the box body 2 movably, and the inner wall of the box body 2 is equipped with a limit component which provides guidance for the movement of the filter assembly 6; the filter assembly 6 includes several concentrically arranged annular plates 11, and two adjacent groups of annular plates 11 are connected by a netting 12, the bottom of the annular plate 11 is equipped with a chemical dosing component 9, and the inner side of the innermost annular plate 11 is equipped with an adapter sleeve 5, the middle of the adapter sleeve 5 is screw-thread fitted with a drive rod 4, and one end of the drive rod 4 is running fitted to a bearing seat 7 installed inside the box body 2, and the other end extends to the outside of the box body 2 and is fixedly connected with a motor 1.

When treating sewage, the motor 1 drives the driving rod 4 to rotate firstly, due to the driving rod 4 is screw-thread fitted with the adapter sleeve 5, the driving rod 4 will drive the adapter sleeve 5 and lead the annular plate 11 and the netting 12 to move upwards as a whole to ensure that the annular plate 11 and the netting 12 move to the top of the water injection gap 10, and thus the sewage is injected into the box body 2 from the water injection gap 10, and then the annular plate 11 and the netting 12 are driven by the motor 1 to move downwards, and thus penetrate into the sewage. When the annular plate 11 and the netting 12 penetrate into the sewage, the chemical dosing component 9 releases the purification agent to the sewage layers with different depths, so that the purification agent may fully react with the sewage, and thus improves the purification efficiency of the sewage. Meanwhile, in the process of the netting 12 penetrating into the sewage, the sewage will get to the top of the netting 12 from the bottom of the netting 12, resulting in "stirring" effect on the sewage, and thus accelerates the reaction speed of the purification agent against the sewage, as well as further improves the sewage purification effect; when the annular plate 11 and the netting 12 move to the bottom of box body 2, the operation of the motor 1 stops. After the sewage and the purification agent fully reacted and forms a colloid to be precipitated out, the motor 1 is controlled to rotate in the reverse direction, and the annular plate 11 and the netting 12 are driven by the drive rod 4 to move upwards, and the precipitated colloid is filtered through the netting 12, and then carries the colloid away from the sewage to complete the separation of the reaction product and the sewage.

Several said annular plates (11) are sequentially arranged at equal intervals.

The chemical dosing component 9 includes several detachable chemical dosing boxes 14 arranged at the bottom of the annular plate 11, and the purification agent is stored in the chemical dosing box 14, and the side wall of the chemical dosing box 14 is equipped with a through hole 15.

When the annular plate 11 drives the chemical dosing component 9 to fall off inside the sewage, the sewage flows into the chemical dosing box 14 through the through hole 15, and thus mixes with the purification agent, then diffuses to various areas of the sewage as the chemical dosing box 14 moves to realize complete purification of the sewage.

Specifically, the upper part of the chemical dosing box 14 is equipped with a threaded hole, and the bottom of the annular plate 11 is fixedly connected with the threaded post adapted to the threaded hole.

The chemical dosing box 9 is connected to the bottom of the annular plate 11 through the twist-on fitting of the threaded hole and the threaded post, and thus makes the annular plate 11 is controlled by the motor 1 to move upwards when the sewage is completed and the chemical dosing is performed, to ensure that the chemical dosing box 9 is located at the water injection gap 10. In addition, the chemical dosing box 9 can be removed through the water injection gap 10 and refilled with the purification agent.

In order to facilitate the removal of all chemical dosing box 9 from the bottom of the annular plate 11, the water injection gaps 10 are symmetrically arranged in two groups against box body 2.

The limit component includes a guide bar 3 installed on the inside wall of the box body 2, and the outside of the outermost annular plate 11 is cut a card slot 13 adapted to the guide bar 3.

The outermost annular plate 11 is slidably fitted with the guide bar 3 through the card slot 13, and thus makes the motor 1 can maintain stability when the motor 1 drives the annular plate 11 and the netting 12 to move upwards and downwards inside the box body 2.

The working principle of this embodiment is: when treating sewage, the motor 1 drives the driving rod 4 to rotate firstly, due to the driving rod 4 is screw-thread fitted with the adapter sleeve 5, the driving rod 4 will drive the adapter sleeve 5 and lead the annular plate 11 and the netting 12 to move upwards as a whole to ensure that the annular plate 11 and the netting 12 move to the top of the water injection gap 10, and thus the sewage is injected into the box body 2 from the water injection gap 10, and then the annular plate 11 and the netting 12 are driven by the motor 1 to move downwards, and thus penetrate into the sewage. When the annular plate 11 and the netting 12 penetrate into the sewage, the chemical dosing component 9 releases the purification agent to the sewage layers with different depths, so that the purification agent may fully react with the sewage, and thus improves the purification efficiency of the sewage. Meanwhile, in the process of the netting 12 penetrating into the sewage, the sewage will get to the top of the netting 12 from the bottom of the netting 12, resulting in "stirring" effect on the sewage, and thus accelerates the reaction speed of the purification agent against the sewage, as well as further improves the sewage purification effect; when the annular plate 11 and the netting 12 move to the bottom of box body 2, the operation of the motor 1 stops. After the sewage and the purification agent fully reacted and forms a colloid to be precipitated out, the motor 1 is controlled to rotate in the reverse direction, and the annular plate 11 and the netting 12 are driven by the drive rod 4 to move upwards, and the precipitated colloid is filtered through the netting 12, and then carries the colloid away from the sewage to complete the separation of the reaction product and the sewage.

Embodiment 2

Referring to FIG. 1, as for a kind of an integrated wastewater treatment equipment for paper mill, compared with the Embodiment 1, this embodiment is provided with a drain valve on the drainage pipe 8. When the sewage is purified, the drain valve is in a closed state. After the sewage is purified, the drain valve is opened, and thus the purified sewage inside the tank 2 is discharged.

In the embodiment of the present invention, through the arrangement of the filter assembly 6 and the chemical dosing component 9, the filter assembly 6 and the chemical dosing component 9 are driven by the motor 1, and thus penetrate into the sewage. In this process, the purification agent in the chemical dosing component 9 diffuses into the sewage with different depths, and thus completely mixes with sewage to improve the reaction effect of the purification agent against sewage, as well as improve the sewage purification efficiency. After the colloid in the sewage is precipitated, the motor 1 drives the filter assembly 6 to move upwards to take the colloid away from the sewage, and thus completes the separation of colloid and sewage.

The preferred embodiments of the present patent are described in detail above, but the present patent is not limited to the above embodiments. Within the scope of knowledge possessed by those skilled in the art, various changes can be made without departing from the purpose of the present patent.

The invention claimed is:

1. A kind of an integrated sewage treatment equipment for paper mill, includes a box body (2), the box body (2) is arranged with at least one water injection gap (10) on the upper side, and the bottom of the box body (2) is connected with a drainage pipe (8), characterized in that a filter assembly (6) is arranged inside the box body (2) movably, and the inner wall of the box body (2) is equipped with a limit component which provides guidance for the movement of the filter assembly (6); the filter assembly (6) includes several concentrically arranged annular plates (11), and two adjacent groups of annular plates (11) are connected by a netting (12), the bottom of each of the annular plates (11) is equipped with a chemical dosing component (9), and the inner side of the innermost annular plate (11) is equipped with an adapter sleeve (5), the middle of the adapter sleeve (5) is screw-thread fitted with a drive rod (4), and one end of the drive rod (4) is running fitted to a bearing seat (7) installed inside the box body (2), and the other end extends to the outside of the box body (2) and is fixedly connected with a motor (1);

the chemical dosing component (9) includes several detachable chemical dosing boxes (14) arranged at the bottom of the annular plate (11), and the purification agent is stored in the chemical dosing box (14), and the side wall of the chemical dosing box (14) is equipped with a through hole (15); and the limit component includes a guide bar (3) installed on the inside wall of the box body (2), and the outside of the outermost annular plate (11) is cut a card slot (13) adapted to the guide bar (3).

2. The kind of an integrated sewage treatment equipment for paper mill according to claim 1, characterized in that several said annular plates (11) are sequentially arranged at equal intervals.

3. The kind of an integrated sewage treatment equipment for paper mill according to claim 1, characterized in that the upper part of the chemical dosing box (14) is equipped with a threaded hole, and the bottom of the annular plate (11) is fixedly connected with a threaded post adapted to the threaded hole.

4. The kind of an integrated sewage treatment equipment for paper mill according to claim 1, characterized in that the water injection gaps (10) are symmetrically arranged in two groups against box body (2).

5. The kind of an integrated sewage treatment equipment for paper mill according to claim 1, characterized in that a drain valve is arranged on the drainage pipe (8).

* * * * *